United States Patent Office 3,404,022
Patented Oct. 1, 1968

3,404,022
PROCESS FOR FLAMEPROOFING CELLULOSIC MATERIAL
Leon H. Chance, New Orleans, and George L. Drake, Jr., and Wilson A. Reeves, Metairie, La., assignors to the United States of America as represented by the Secretary of Agriculture
No Drawing. Filed Mar. 26, 1965, Ser. No. 443,108
7 Claims. (Cl. 117—62.2)

ABSTRACT OF THE DISCLOSURE

Flame retardant cotton fabric, durable to laundering, was prepared by treatment with aqueous precondensates of tetrakis(hydroxymethyl)phosphonium chloride (THPC) and tris(carbamoylethyl)phosphine (TCEP) or tris(carbamoylethyl)phosphine oxide (TCPO) in various mole ratios, the preferred mole ratio of THPC to TCEP or TCPO being 4:1 and preferably followed by fixation with ammonia gas.

---

A non-exclusive, irrevocable, royalty-free license in the invention herein described, throughout the world for all purposes of the United States Government, with the power to grant sublicenses for such purposes, is hereby granted to the Government of the United States of America.

This invention, together with the invention disclosed in Ser. No. 443,113 filed of even date, is a further improvement in or modification of the invention claimed in U.S. Patent No. 2,772,188, U.S. Patent No. 2,983,623, and U.S. Patent No. 3,276,897. More particularly, this invention relates to the treatment of cellulosic materials with a partially polymerized water soluble product containing a further polymerizable polymer which contains phosphorus and nitrogen, and which is insolubilized within the cellulosic material with ammonia, thereby producing a flame-retardant cellulosic material having improved strength retention after chlorine bleaching and scorching, and having little or no yellowing of white cellulosic materials after bleaching with chlorine.

U.S. Patent No. 2,772,188 defines the nature of the further-polymerizable compounds as methylol-phosphorus polymers in one of the water soluble stages when applied to the cellulosic materials. The invention then describes a process to further polymerize methylol-phosphorus polymers without the use of heat. This further polymerization is accomplished by using ammonia, in the form of gaseous ammonia, ammonium hydroxide, a solution of ammonia in an inert solvent, or as ammonia released in situ by the reaction of a compound capable of releasing ammonia, e.g., an ammonium salt of a weak acid, such as ammonium acetate.

U.S. Patent 2,983,623 claims an improved method of insolubilizing the further-polymerizable methylol-phosphorus polymeric materials by treating with gaseous ammonia first and aqueous ammonia afterwards. The process described in this patent is briefly: impregnation of a cellulosic material with an aqueous solution or dispersion of a further-polymerizable methylol-phosphorus polymeric material; drying the cellulosic material; treating the cellulosic material in ammonia gas; treating the cellulosic material in aqueous ammonia; washing, rinsing, and drying the cellulosic material.

Whereas any of the further-polymerizable methylol-phosphorus polymeric materials referred to in Patent No. 2,772,188 are satisfactory for the processes of Patent No. 2,983,623, a particularly suitable polymeric material is claimed to be the reaction product of tetrakis(hydroxymethyl)phosphonium chloride (THPC) and urea. Scoured and bleached cotton fabric treated by this process was flame resistant, passing the standard vertical flame test (Fed. Spec. CCC-T-191b). The treated fabric was fairly stiff, and when given a chlorine bleach turned yellow. Furthermore, after chlorine bleaching and scouring, the fabric retained only 25–30% of its warp breaking strength.

Particularly suitable precondensates referred to in Patent No. 3,276,897 are claimed to be the reaction products of tetrakis(hydroxymethyl)phosphonium chloride (THPC) and tris(carbamoylethyl)amine or ethyl carbamate. Cellulosic materials which contain these polymers are claimed to show virtually no discoloration and very little strength loss after chlorine bleaching and scorching.

It is the object of this invention to provide a method of preparation of new precondensates and a process for the application of the precondenates to impart improved flame resistance to cellulosic materials.

A further object of this invention is to provide white cellulosic materials which will show virtually no discoloration after chlorine bleaching.

Another object of this invention is to provide white cellulosic materials which retain essentially all of their breaking strength after chlorine bleaching and scorching.

Still another object of this invention is to provide a method of producing cellulosic materials which retain their flame-retarding properties after frequent washings.

These and other objects of this invention will be apparent to those skilled in the art of making flame-retardant cellulosic materials.

In general, the process of this invention comprises reacting a further-polymerizable methylol-phosphorus polymeric material containing a methylol-phosphorus group with ammonia.

Methylol-phosphorus polymeric materials are produced by reacting at least one compound of the group tetrakis(hydroxymethyl)phosphonium chloride, tris(hydroxymethyl)phosphine oxide, and phosphorus-linked methylol-group-containing derivatives thereof, with compounds containing a plurality of groups which yield condensation products with a phosphorus-linked methylol group.

The process of this invention is particularly useful in the insolubilization of nitrogen methylol-phosphorus polymers with ammonia. Preferred nitrogen methylol-phosphorus polymers are produced by reacting at least one phosphorus compound of THPC and/or THPC with a phosphorus containing carboxamide of the general formula

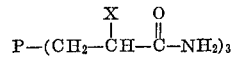

or

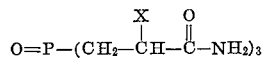

where X is hydrogen or a lower alkyl group, such as methyl or ethyl.

In accordance with this invention, any cellulosic material such as cotton, rayon, paper, jute, ramie, and the like, may be treated, but the invention is particularly effective when applied to the treatment of cellulosic textiles.

In preparing the further polymerizable nitrogen methylol-phosphorus polymers, the aforementioned compounds are mixed with water and partially polymerized to form a precondensate. This may be at any temperature from room temperature to the reflux temperature. When the partial polymerization takes place at the reflux temperature, the time may vary up to two hours, although one-half hour is usually adequate. Particularly suitable polymeric materials are the reaction products of tetrakis(hydroxymethyl)phosphonium chloride (THPC) and tris(2- carbamoylethyl)phosphine (TCEP), or tris(2-carbamoylethyl)phosphine oxide (TCPO), in mole ratios of THPC:TCEP or THPC:TCPO of about from 2:1 to 5:1. A mole ratio of 4:1 is preferred. These precondensates can be stored over extended periods of time at or below room temperature.

In preparing the solution to treat the cellulosic materials, the precondensate is preferably diluted with buffered water yielding an aqueous solution of the concentration needed to give the desired weight increase to the cellulosic material. The buffer used is the ammonium salt of a weak acid, such as ammonium acetate. Its purpose is to increase the pH of the solutions in order to minimize degradation of the cellulose during the drying step. However, the buffer is not necessary as adequate strength is obtained without it.

The cellulosic material is impregnated with the aqueous solution preferably by padding, although other impregnating techniques may be used; the excess solution is removed by passing the cellulosic material through squeeze rolls, centrifuging, or other methods. The cellulosic material is then dried. The drying temperature can vary from room temperature to 170° C., although 80–90° C. is preferred; the drying time varies from several hours (at room temperature) to a few minutes at the higher temperature. For example, drying of the cellulosic material can be effected in a conventional forced hot air oven for five minutes at 80° C.

Insolubilization with ammonia is accomplished in two steps. First, the dried cellulosic material containing the further polymerizable methylol-phosphorus polymer is exposed to gaseous ammonia, and then to ammonium hydroxide. The gaseous ammonia may be applied at temperatures of from about 25° C. to about 100° C.; the aqueous ammonia may be from about 1 to about 28% ammonia hydroxide, and at temperatures of about from 25° C. to 60° C. Insolubilization may also be carried out by omitting the ammonia gas step, and immersing the dried fabric directly in ammonium hydroxide. The treated cellulosic materials are then washed and dried.

Cellulosic materials treated in accordance with this invention have improved flame-retardant properties which are retained after launderings. When cellulosic materials treated in accordance with this invention are given a chlorine bleach and subsequently scorched, the warp breaking strength retention is more than about 80%.

The following examples illustrate the methods of carrying out the invention but the invention is not restricted to these examples. Treated fabrics were tested by the standard methods of the American Society for Testing Materials, Philadelphia, Pa., Committee D–13. Breaking strength was determined by the one-inch strip method, ASTM designation, D39–59; tearing strength by the Elmendorf method, ASTM designation, D1295–60T; damage by chlorine, by ASA Method, No. L14.126–1961; and flame resistance by the standard vertical method, Fed. Spec. CCC–T–191b. The percentages and parts are by weight.

Example 1

A precondensate was prepared by refluxing for one hour 7.6 parts of tetrakis(hydroxymethyl)phosphonium chloride (THPC), 2.5 parts of tris(2-carbamoylethyl)phosphine (TCEP), and 10.0 parts of water. This was a mole ratio of THPC:TCEP of 4:1. The solution was cooled rapidly and stored at room temperature until used. (Refrigeration is preferable if stored for long periods of time.)

A buffered water solution was prepared by dissolving 35 parts of ammonium acetate in 635 parts of water (Solution A).

The precondensate was diluted to 30 parts with Solution A, to give a solution containing about 33% solids. The pH was 4.4. A piece of olive drab (OD) sateen cotton fabric was impregnated with the solution, and passed through squeeze rolls to give about a 70% wet pickup. The impregnated fabric was dried for five minutes at 85° C. The dry fabric was exposed to gaseous ammonia for three minutes at room temperature (about 25° C.), and then immersed in a 10% ammonium hydroxide solution for three minutes. The treated sample was washed in hot water, and air dried. The weight gain was 9.3%, and the sample contained 2.13% P. It had very good flame resistance. After ten laundering cycles, the sample retained 0.98% P and flame resistance was fair.

Example 2

The procedure of Eample 1 was repeated except the mole ratios of THPC:TCEP were 2:1, 3:1, and 5:1. The respective solution pH's were 3.7, 4.0, and 3.8. The respective weight gains of the fabric samples were 2.7%, 6.3%, and 6.4%. The respective phosphorus contents of these samples were 0.72%, 1.91%, and 1.57%. The flame resistance of the latter two fabric samples was good, and of the former samples only fair due to the very low add-on. After ten laundering cycles, the phosphorus content was 0.26%, 0.87%, and 0.68%, respectively.

Example 3

Three precondensates were prepared as in Example 1 except one was refluxed for 15 minutes, one refluxed for two hours, and one was not refluxed but allowed to react at room temperature (about 25° C.) for 48 hours. Samples of OD sateen were treated with each solution as in Example 1. The respective weight gains of the fabric samples were 8.3%, 6.3%, and 9.1%. The phosphorus content for the latter two was 1.57% and 2.37%, respectively. All of the samples had good flame resistance, the weight gain. After ten laundering cycles, the phosphorus content of the latter two fabric samples was 0.47% and 1.21%, respectively. Considerable flame resistance was retained.

Example 4

A precondensate was prepared by refluxing for 30 minutes 61 parts of THPC, 19.8 parts of TCEP and 80 parts of water. Eighty-five parts of Solution A (see Example 1) were added. The pH of the solution was 4.5. A piece of OD sateen cotton fabric and a piece of white cotton printcloth were impregnated with the solution by passing through squeeze rolls to a wet pickup of 67% and 97%, respectively. The samples were dried five minutes at 85° C., exposed to ammonia gas at room temperature for five minutes, and then immersed in 10% ammonium hydroxide for five minutes, washed, and dried. The respective add-ons were 9.3% and 13.1%. Data appears in Table I.

TABLE I

| Type fabric | Char length (inches) | Elmendorf tearing strength, warp (gms.) | Breaking strength, warp (lbs.) | |
| --- | --- | --- | --- | --- |
| | | | Before Bleach | After bleach and scorch |
| Sateen | 3.3 | 4,533 | 113.7 | 110.3 |
| Printcloth | | 910 | 53.1 | 46.2 |
| Sateen control | | 5,880 | 116.2 | |
| Printcloth control | | 1,040 | 43.0 | |

There was only a very slight yellowing due to chlorine bleaching and scorching either before or after ten laundering cycles. Strength losses were small due to chlorine bleaching and scorching. The flame resistance was reduced after ten laundering cycles, but considerable flame resistance was retained.

Example 5

A precondensate was prepared as in Example 4. The pH was 4.9. Two pieces of OD sateen cotton fabric were treated as in Example 1 except in one case the fabric was exposed to ammonia gas for three minutes and then immersed in 10% ammonium hydroxide at 60° C. for three minutes, and in the other case immersed in 10% ammonium hydroxide at 60° C. for three minutes (omitting the ammonia gas step). The respective add-ons were 9.4% and 6.7%. The former contained 2.25% phosphorus; after ten laundering cycles, the fabric sample still contained 1.06% P.

Example 6

A solution was prepared by mixing 22.92 parts of THPC, 7.90 parts of tris(2-carbamoylethyl)phosphine oxide (TCPO) and 30 parts of water. The solution was divided into three equal parts and refluxed for 30 minutes, one hour, and two hours, respectively. To each solution was added ten parts of Solution A (see Example 1). Each solution contained 33% solids. The pH of the three solutions was 1.9, 1.75, and 1.6, respectively. The pH of each was readjusted with solid ammonium acetate to pH's of 3.2, 2.8, and 2.6, respectively. Pieces of OD sateen were treated with the solutions as described in Example 1. The respective weight gains of the fabric samples were 8.2%, 5.9%, and 3.2%. The respective phosphorus contents of these samples were 1.94%, 1.53%, and 0.96%. The degree of flame resistance increased with increasing weight gain.

Example 7

Four solutions were prepared as shown in Table II.

or after laundering ten times. Strength losses were small after chlorine bleaching and scorching.

Example 9

A precondensate was prepared as in Example 8 except the solution contained 45.84 parts of THPC, 15.79 parts of TCPO, 60.0 parts of water, and 32.4 parts of Solution A (see Example 1). A piece of OD sateen was padded through the solution to a wet pickup of 77%, and treated as in Example 4. The fabric had an add-on of 12%, a char length of 3.2 inches, a tearing strength of 3433 gms. (warp), and a breaking strength of 120.3 lgs. (warp). After ten laundering cycles, the samples failed the vertical flame test, but still retained considerable flame resistance.

Example 10

The precondensate prepared as in Example 8 was stored for four days at room temperature, then padded on four pieces of OD sateen to a wet pickup of about 70%. The fabric samples were exposed to ammonia gas, followed by immersion in ammonium hydroxide, as indicated in Table IV.

TABLE II

| THPC:TCPO mole ratio | Parts of THPC | Parts of TCPO | Parts of Solution A | pH of Solution | (a) | (b) | (c) |
|---|---|---|---|---|---|---|---|
| 2:1 | 7.64 | 5.26 | 26.2 | 3.0 | 4.0 | 1.08 | 0.74 |
| 3:1 | 7.64 | 3.50 | 22.9 | 3.0 | 6.4 | 1.60 | 0.31 |
| 4:1 | 15.28 | 5.26 | 41.7 | 3.2 | 8.2 | 1.94 | 0.88 |
| 5:1 | 9.55 | 2.63 | 24.7 | 3.0 | 7.8 | 1.92 | 0.45 |

(a) Percent add-on to fabric.
(b) Percent P.
(c) Percent P after ten laundering cycles.

The THPC and TCPO were dissolved in Solution A and then refluxed for 30 minutes. The pH was then adjusted to the values shown in Table II by addition of solid ammonium acetate. Samples of OD sateen were treated with the solutions of Table II as in Example I. The add-on and phosphorus content of the treated fabric samples, before and after ten laundering cycles, are shown in Table II. All fabric samples had good flame resistance, the de- with the solutions of Table II as in Example 1. The add-on both before and after laundering.

Example 8

A precondensate was prepared by refluxing for 30 minutes 61.0 parts of THPC, 21.0 parts of TCPO, and 65 parts of water, and cooling rapidly. Then 86.2 parts of Solution A were added. The solution obtained contained 33% solids and the pH was 3.75. A sample of OD sateen and a sample of white printcloth were padded through this solution to a wet pickup of 65% and 99%, respectively. The impregnated fabric samples were then treated as in Example 4. The data are shown in Table III.

TABLE IV

| Sample No. | Time in NH$_3$ gas, minutes | Conc. of NH$_4$OH, percent | Time in NH$_4$OH, minutes | Add-on to fabric, percent |
|---|---|---|---|---|
| 1 | 3 | 1 | 3 | 9.8 |
| 2 | 3 | 28 | 3 | 10.3 |
| 3 | 1 | 28 | 1 | 10.4 |
| 4 | 3 | 28 | 3 | 8.5 |

All reactions with ammonia gas and ammonium hydroxide were conducted at room temperature with one exception. Sample No. 4 was exposed to ammonia gas which was heated to about from 60 to 70° C. All of the samples had very good flame resistance.

Example 11

A precondensate was prepared by mixing 45.8 parts of THPC and 14.8 parts of TCEP in 60 parts of water and refluxing for 30 minutes. The solution was then diluted with 31 parts of water to make a 40% solution of the precondensate. No buffer was used. The solution was padded on to OD sateen, dried eight minutes at 85° C. and then

TABLE III

| Type fabric | Add-on, percent | Before laundering | | | | After ten laundering cycles | | | |
|---|---|---|---|---|---|---|---|---|---|
|  |  | (a) | (b) | (c) | (d) | (e) | (f) | (g) | (h) |
| Printcloth | 13.5 |  | 807 | 48.2 | 43.5 |  | 767 | 42.6 | 42.5 |
| Sateen | 7.6 | 4.2 | 4,667 | 113.3 |  | BEL* | 4,000 | 94.4 | 88.0 |
| Sateen control |  |  | 5,880 | 116.2 |  |  | 4,533 | 100.9 | 96.9 |

(a) Char length, inches.
(b) Tearing strength, (warp) gms.
(c) Breaking strength, (warp) lbs.
(d) Chlorine resistance, (warp) lbs.
(e) Char length, inches.

(f) Tearing strength, (warp) gms.
(g) Breaking strength, (warp) lbs.
(h) Chlorine resistance, (warp) lbs.
*BEL—Burned entire length of sample.

There was no yellowing of the white printcloth after the chlorine bleaching and scorching test, either before immersed in 10% ammonium hydroxide for ten minutes at about from 60° to 65° C., rinsed, and dried.

The experiment was repeated using TCPO instead of TCEP at the same concentration and mole ratio. The data are shown in Table V.

TABLE V

| Precondensate type | Add-on, percent | Char length (inches) | Tearing strength (warp) gms. | Breaking strength (warp) lbs. | Stiffness ×10⁻⁴ |
|---|---|---|---|---|---|
| THPC-TCEP | 8.1 | 3.1 | 5,200 | 112.3 | 20.8 |
| THPC-TCPO | 7.7 | 3.7 | 4,667 | 116.9 | 44.4 |

The strength compares favorably with samples in which a buffer was used.

We claim:

1. A process for treating cellulosic material which comprises:
   (a) treating said cellulosic material with a solution of a further-polymerizable methylol phosphorus polymeric material containing at least one free methylol group attached to a phosphorus atom, said polymeric material prepared by treating a precondensate comprising a partially polymerized mixture of from about 2 to 5 mols of tetrakis(hydroxymethyl)phosphonium chloride per mol of a member selected from the group consisting of phosphorus-containing carboxamides of the general formula

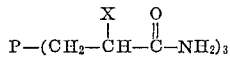

and

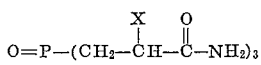

where X consists of hydrogen or a lower alkyl group,
   (b) drying the treated material,
   (c) exposing the treated material to gaseous ammonia for a period of time about from one to five minutes, at about from room temperature to 100° C.,
   (d) immersing the material in a 10% to 29% aqueous ammonia solution for periods of time about from one to five minutes, at about from room temperature to 60° C., the longer periods of time being applicable to the lower temperatures, and
   (e) washing and drying the material employing standard procedures.

2. The process of claim 1, wherein the phosphorus-containing carboxamide is a compound having the formula

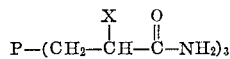

and X consists of hydrogen or a lower alkyl group.

3. The process of claim 1 wherein the phosphorus-containing carboxamide is a compound having the formula

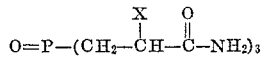

and X consists of hydrogen or a lower alkyl group.

4. The process of claim 1 wherein the phosphorus-containing carboxamide is tris(carbamoylethyl)phosphine.

5. The process of claim 1 wherein the phosphorus-containing carboxamide is tris(carbamoylethyl)phosphine oxide.

6. A process for treating cellulosic material which comprises:
   (a) treating the cellulosic material with an aqueous solution of a further-polymerizable methylol phosphorus polymeric material containing at least one free methylol group attached to a phosphorus atom, said polymeric material prepared by treating a precondensate comprising a partially polymerized mixture of from about 2 to 5 parts by weight of tetrakis(hydroxymethyl)phosphonium chloride per part of tris(carbamoylethyl)phosphine,
   (b) drying the treated material,
   (c) immersing the material in a 10% to 29% aqueous ammonia solution for periods of time about from one to five minutes, at about from room temperature to 70° C., the longer periods of time being applicable to the lower temperature, and
   (d) washing and drying the material.

7. A process for treating cellulosic material which comprises:
   (a) treating the cellulosic material with an aqueous solution of a further-polymerizable methylol phosphorus polymeric material containing at least one free methylol group attached to a phosphorus atom, said polymeric material prepared by treating a precondensate comprising a partially polymerized mixture of from about 2 to 5 parts by weight of tetrakis(hydroxymethyl)phosphonium chloride per part of tris(carbamoylethyl) phosphine oxide,
   (b) drying the treated material,
   (c) immersing the material in a 10% to 29% aqueous ammonia solution for periods of time about from one to five minutes, at about from room temperature to 70° C., the longer periods of time being applicable to the lower temperatures, and
   (d) washing and drying the material.

References Cited

UNITED STATES PATENTS

| 2,772,188 | 11/1956 | Reeves et al. | 117—136 |
| 2,983,623 | 5/1961 | Coates | 117—62.2 |
| 3,250,811 | 5/1966 | Chance et al. | 117—138.5 X |
| 3,270,052 | 8/1966 | Chance et al. | 117—137 X |
| 3,276,897 | 10/1966 | Reeves et al. | 117—136 X |

WILLIAM D. MARTIN, *Primary Examiner.*

J. BORDERS, *Assistant Examiner.*